United States Patent
Das et al.

(10) Patent No.: US 7,079,848 B2
(45) Date of Patent: Jul. 18, 2006

(54) NETWORK CONTROLLED FAST CELL SWITCHING

(75) Inventors: Arnab Das, Old Bridge, NJ (US); Farooq Ullah Khan, Manapalan, NJ (US); Ashwin Sampath, Somerset, NJ (US); Hsuan-Jung Su, Ocean, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 426 days.

(21) Appl. No.: 10/117,498

(22) Filed: Apr. 5, 2002

(65) Prior Publication Data

US 2004/0203819 A1    Oct. 14, 2004

(51) Int. Cl.
*H04M 1/00* (2006.01)
*H04Q 7/00* (2006.01)
*G21C 17/00* (2006.01)

(52) U.S. Cl. .............................. 455/452.2; 455/452.1; 370/328; 702/186

(58) Field of Classification Search ............. 455/452.1, 455/452.2, 450, 509, 512, 517, 437, 412, 455/436; 370/328, 335; 702/186
See application file for complete search history.

(56) References Cited

U.S. PATENT DOCUMENTS

| | | | | |
|---|---|---|---|---|
| 5,666,654 A | * | 9/1997 | Kanai | 455/512 |
| 5,666,655 A | * | 9/1997 | Ishikawa et al. | 455/512 |
| 6,041,237 A | * | 3/2000 | Farsakh | 455/450 |
| 6,434,380 B1 | * | 8/2002 | Andersson et al. | 455/406 |
| 6,845,238 B1 | * | 1/2005 | Muller | 455/436 |
| 6,850,500 B1 | * | 2/2005 | Zeira et al. | 370/328 |
| 2002/0019231 A1 | * | 2/2002 | Palenius et al. | 455/437 |
| 2002/0082808 A1 | * | 6/2002 | Saarinen et al. | 702/186 |
| 2002/0094817 A1 | * | 7/2002 | Rune et al. | 455/450 |
| 2002/0145988 A1 | * | 10/2002 | Dahlman et al. | 370/335 |
| 2003/0096597 A1 | * | 5/2003 | Au et al. | 455/412 |
| 2003/0156556 A1 | * | 8/2003 | Puig-Oses et al. | 370/328 |
| 2003/0157900 A1 | * | 8/2003 | Gaal et al. | 455/69 |
| 2003/0185242 A1 | * | 10/2003 | Lee et al. | 370/491 |
| 2004/0203973 A1 | * | 10/2004 | Khan | 455/517 |

* cited by examiner

*Primary Examiner*—George Eng
*Assistant Examiner*—Kiet Doan

(57) ABSTRACT

A method that globally allocates resources of a communication system. A global fast scheduler receives global CQI information from UEs of a communication system. The global fast scheduler determines a resource allocation value and assigns a UE to any available cell site that is a member of the active set of the UE and which can service the UE in accordance with the determined resource allocation value.

7 Claims, 3 Drawing Sheets

NETWORK CONTROLLED FAST CELL SWITCHING

BACKGROUND OF THE INVENTION

1. Field of the Invention

The present invention generally relates to communication systems and in particular to wireless communication systems.

2. Description of the Related Art

Communication systems, and in particular, wireless communication systems are limited in the amount of resources they can allocate to their users. Examples of resources for wireless communication systems include transmit power, bandwidth and data rate. In some wireless communication systems such as cellular Code Division Multiple Access (CDMA) systems, a user equipment (UE) is assigned to a plurality of cell sites that is referred to as that UE's active set of cells. A cell is a geographical area defined by physical boundaries. Each cell has base station equipment or a cell site that services the UEs located in that cell. A UE is serviced by a cell site when the cell site performs various operations in accordance with protocols being followed by the communication system to enable the UE to communicate with the system and/or with other user equipment of the system. Examples of user equipment include cellular telephones, pagers and wireless personal computers. A protocol is generally a set of rules that dictate how communication is to be initiated, maintained and terminated between system equipment and/or user equipment of the communication system. Protocols are usually part of a standard established by standards bodies, industry groups and/or governmental regulatory bodies.

Wireless communication systems such as systems that comply with the well known 1x-EV-DO (cdma 2001x-Evolution-Data Optimized) and 1xEV-DV (cdma 2001x-Evolution-Data Voice) standards as well as the High Speed Downlink Packet Access (HSDPA) specification in the Universal Mobile Telecommunication System (UMTS) standard can accommodate the conveyance of data information and are hereinafter referred to wireless data systems. The wireless data systems are structured in substantially the same manner as other wireless communication systems in that they comprise a plurality of base stations each located in a cell.

Base station equipment (or cell sites) is generally system equipment comprising communication equipment (e.g., radio transmitters, receivers, processing equipment) owned, controlled and operated by system providers. System providers are entities such as local telephone companies, long distance telephone companies, Internet Service Providers (ISP) and other communication service providers.

As a UE migrates between cells of a communication system, it selects a cell—from its active set of cells—to provide it service. The UE selects the cell based on C/I values it measures from all the members of its active set of cells. The C/I, which is the Carrier to Interference ratio, is calculated by the UE from the measurement of pilot signals transmitted by the cell site. Each cell site transmits a pilot signal that, inter alia, serves to indicate the presence of system equipment of a wireless communication system to UE's in the vicinity of the cell. The transmission power of the pilot signal of the cell site is known by the UE and thus the UE is able to calculate the C/I from its measurement of the power of received pilot signals. The C/I is essentially equivalent the signal-to-noise (SNR) ratio of a communication channel of the system. The servicing of a UE by a cell site is the provision of resources by the cell site to the UE to allow the UE to communicate with other users and system equipment of the communication system in accordance with a protocol being followed by the communication system.

The calculated C/I is one type of Channel Quality Indicator (CQI) that can be sent by a UE to members of its active set. The CQI is a type of information that a UE can transmit to members of its active set of cells that indicates the relative quality of the communication channels between the cells and the UE. The UE can measure and send other types of CQI information to the members of its active set. When the UE is located in the communication system such that it can be serviced by more than one cell, it has to decide from which cell it will receive service. Typically, the UE selects the cells with the best channel quality indicated by CQI among its active set of cells. For example, a UE would select the cell site with the highest C/I among its active set of cell sites and switches to that cell site, i.e., obtains service from that cell site. The UE selects a cell site and thus switches to that cell site by transmitting CQI information that can only be decoded by that cell site. Thus, for example, in CDMA communication systems, the UE encodes its CQI information with the Walsh cover of the selected cell site thereby enabling only the selected cell site to decode the transmitted CQI information. In CDMA systems each cell site is assigned a unique Walsh cover, i.e., a Walsh code, which is used to encode information sent to that cell site. Therefore, only that cell site is able to decode the information. The selected cell site receives and decodes the CQI. It should be noted that the UE encodes its CQI and other signaling information with a particular type of additional coding that identifies the UE. All of the cell sites are provided with information about the additional coding used by the UEs that the cell sites service. Therefore, the selected cell site will be able to identify the UE from the type of additional coding the UE applied to the CQI and other information sent to the cell site. It should also be noted that cell switching encompasses the situation when a UE is switching from a sector of one cell to another sector of the same cell where the same is a portion of a cell that has its own sector cell equipment. Typically, the sectors use the same physical system equipment which is logically separated for each sector so as to make it seem as if each sector has its own system equipment.

The selected cell site then services the UE for at least a Transmission Time Interval (TTI). The TTI is a communication system defined time period during which signaling information and user information (i.e., data traffic) are transmitted from a cell site to a UE. The TTI for the UMTS system can be 10, 20, 40 or 80 milliseconds. The TTI for the evolving wireless data systems such as HSDPA in UMTS and 1xEV-DO is smaller than 10 milliseconds. The TTI in HSDPA is 2.0 milliseconds long and 1xEV-DO the TTI is 1.67 milliseconds long. Both the data traffic and the signaling information are carried in data blocks transmitted over a one or more TTIs. The user information or data traffic is information (e.g., voice, video, text, graphical information) being conveyed between users of the communication system. The signaling information is information used by the system to manage and otherwise control the operation of communication channels of the communication system. The signaling information usually complies with the protocol being followed by the communication system. The CQI is part of the signaling information.

Each cell site is limited in the amount of resources it can provide to the various UEs that it is servicing. When a UE selects a cell site for service, the UE bases such a selection on the CQI. However, the CQI may not be a proper indicator on the best cell site (in the active set of the UE) to select at that time. When a UE selects a cell site from its active set of cell sites because that cell site had the highest C/I or the highest data rate available in the active set of cell sites, the selection of that cell may not be—from an overall system point of view—the best cell site to select. The UE makes its decision based on its measurement of one particular channel quality of the members of its active set. Once a UE selects a cell site, the communication system then schedules the UE at the selected cell site. The system equipment that does the scheduling is commonly referred to as the scheduler. Thus, typically at any instant of time, a cell site has several UEs that are scheduled to be serviced. The scheduling is the determination of when a particular UE is to be serviced by a particular cell site. The UEs to be scheduled by the system are placed in a queue at the cell site which the UE selected. For each cell site, the scheduler then makes its scheduling decisions based on one or more system resource requirement of the UE which selected that cell site.

For example, suppose there are six user equipment, UE1, UE2, UE3, UE4, UE5 and UE6, all of whom can be serviced by either Cell-1 or Cell-2 of a CDMA communication system. In other words, Cell-1 and Cell-2 are cell sites that are members of the active sets of the six UEs. Also, suppose that UE1(3.0 Mb/s), UE2(10.0 Mb/s), UE3(8.0 Mb/s) selected Cell-1 and UE4(500 Kb/s), UE5(200 Kb/s), UE6 (1.0 Mb/s) selected Cell-2 for service where the CQI on which the scheduler makes its scheduling decision is the data rate (value in parentheses) requested by each user. In other words, the scheduler selects the UE with the highest data rate from a queue of users for each cell site. The system scheduler places UE1, UE2 and UE3 in a queue at Cell-1 and UE4, UE5, UE6 in a queue at Cell-2. At the next scheduling, UE2 is scheduled on Cell-1 and UE6 is scheduled on Cell-2 because UE2 has the highest data rate of all the users in the queue for Cell-1 and UE6 has the highest data rate of all the users in the queue for Cell-2. The total data rate for the two cells is thus 11.0 Mb/s. The problem with the above scheduling scheme is that the scheduling decision is performed on a cell by cell basis without any consideration of the resources available from the overall system. In the example given above, it is possible that Cell-2 could have handled a higher data rate than the 1.0 Mb/s data rate of UE6, but because the UEs allocated to Cell-2 are the only UEs that can be considered in scheduling Cell-2, UE6 was the best choice at that time. Therefore, there is a lack of flexibility in scheduling which often leads to inefficient allocation of system resources.

SUMMARY OF THE INVENTION

The present invention provides a method of allocating at least one resource of a communication system to user equipment so as to improve overall system efficiency and provide improved scheduling flexibility. A global fast scheduler receives global CQI information of UEs requesting service. The global fast scheduler thus knows which UEs want to be scheduled. The global fast scheduler also has access to the active set information of the UEs. Based on the received global CQI information and the information on the active set of the UE, the global fast scheduler determines resource allocation values for the cell sites in the UE's active set. The global fast scheduler then assigns a UE to a cell site which has a resource allocation value—for the UE—that tends to improve overall system performance. The global fast scheduler is thus able to flexibly assign a UE to any cell site that is a member of the active set of that UE. As a result, the overall efficiency of the system is improved because the global fast scheduler operates to improve overall system performance and not the performance of a particular cell site.

DETAILED DESCRIPTION

The present invention provides a method of allocating at least one resource of a communication system to user equipment so as to improve overall system efficiency and provide improved scheduling flexibility. A global fast scheduler receives global CQI information of all UEs requesting service. The global fast scheduler thus knows which UEs want to be scheduled. The global fast scheduler also has access to the active set information of all the UEs. Based on the received global CQI information and the information on the active set of the UE, the global fast scheduler determines resource allocation values for the cell sites in the UE's active set. The global fast scheduler then assigns the UE to a cell site which has a resource allocation value—for the UE—that tends to improve overall system performance. The global fast scheduler is thus able to flexibly assign a UE to any cell site that is a member of the active set of that UE. As a result, the overall efficiency of the system is improved because the global fast scheduler operates to improve overall system performance and not the performance of a particular cell site.

The global fast scheduler is able to quickly schedule UEs because the global fast scheduler takes advantage of the relatively short Transmit Time Interval (TTI) of many wireless data systems. Further, the global fast scheduler is preferably located in cell site equipment thereby directly interacting with the UEs thus allowing for relatively fast scheduling.

Figure 1:
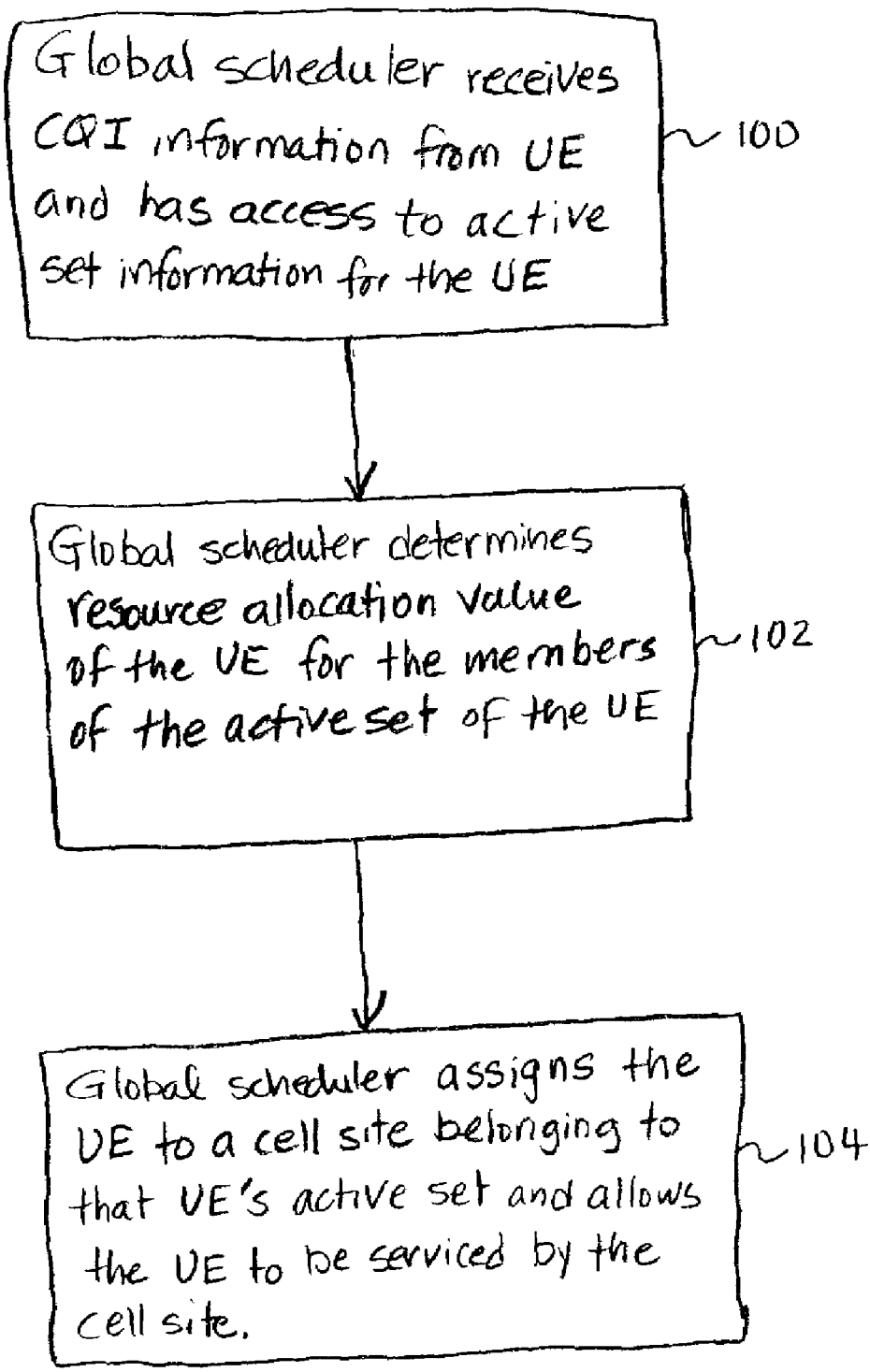
FIG. 1 depicts the method of the present invention from the standpoint of system equipment of a communication system.

Referring now to FIG. 1, there is shown the method of the present invention for a global fast scheduler that is part of the system equipment of a communication system. The global fast scheduler is system equipment and/or software that is able to transmit and receive information to and from the cell sites of the system and is able to cause any of the cell sites to transmit certain types of information to UEs of the communication system. The global fast scheduler can be located—at some central hub of the communication system.

For the sake of discussion only, the method of the present invention will be discussed in the context of HSDPA in Universal Mobile Telecommunications System (UMTS). UMTS is one type of standard that is followed by many CDMA wireless communication systems. In HSDPA, each cell site equipment transmits signaling information over four separate downlink signaling channels known HS-SCCHs (High Speed Share Control CHannels). Also, in HSDPA, a UE transmits signaling information to cell sites belonging to its active set over an uplink signaling channel known as the HS-DPCCH (High Speed Dedicated Physical Control CHannel). A downlink is at least one communication channel through which information is transmitted from a cell site to a UE. An uplink is at least one communication channel through which information is transmitted from a UE to a cell site. The UE transmits the global CQI in order to obtain resources (or at least one resource) that allow it to receive downlink data traffic from a cell site. However, the method of the present invention also includes global CQI information—transmitted by the UE—that allow the UE to transmit uplink data traffic to a particular cell site.

In step 100, the global fast scheduler receives global CQI information from a UE over the HS-DPCCH. The UE transmits its global CQI from its measurements of one or more communication signals transmitted by the cells in the UE's active set. The communication signal being measured can be, for example, the pilot signal of the cell sites. Unlike in the prior art the CQI information transmitted by the UE is meant for the global fast scheduler and not to a specific cell site; thus the CQI information is global. In other words, the UE performs a transmission of its global CQI information to all available members in their active set. Thus, the global CQI information is CQI meant for the global fast scheduler and is to be received by all available members of the UE's active set. An available member is a cell site in the vicinity of the UE or a cell site that is capable of receiving global CQI information from the UE. The global fast scheduler has access to active set information for the UEs; that is, for each UE, the global fast scheduler has information that identify all of the members of the active set of the UE. The active set information may, for example, reside in the cell sites or reside at a system database not necessarily located at a cell site. The global fast scheduler can change the active set of a UE based on one or more factors. For example, the global fast scheduler can monitor the CQI information received from various cell sites and remove a cell site from a UE's active set if that cell site has developed a certain pattern of CQI that tends to have an adverse effect on scheduling. Also, a cell site may become unduly loaded from various UE's switching to it; in that case the global fast scheduler can lessen the load on that cell site by removing it from the active set of various UEs.

Figure 2:
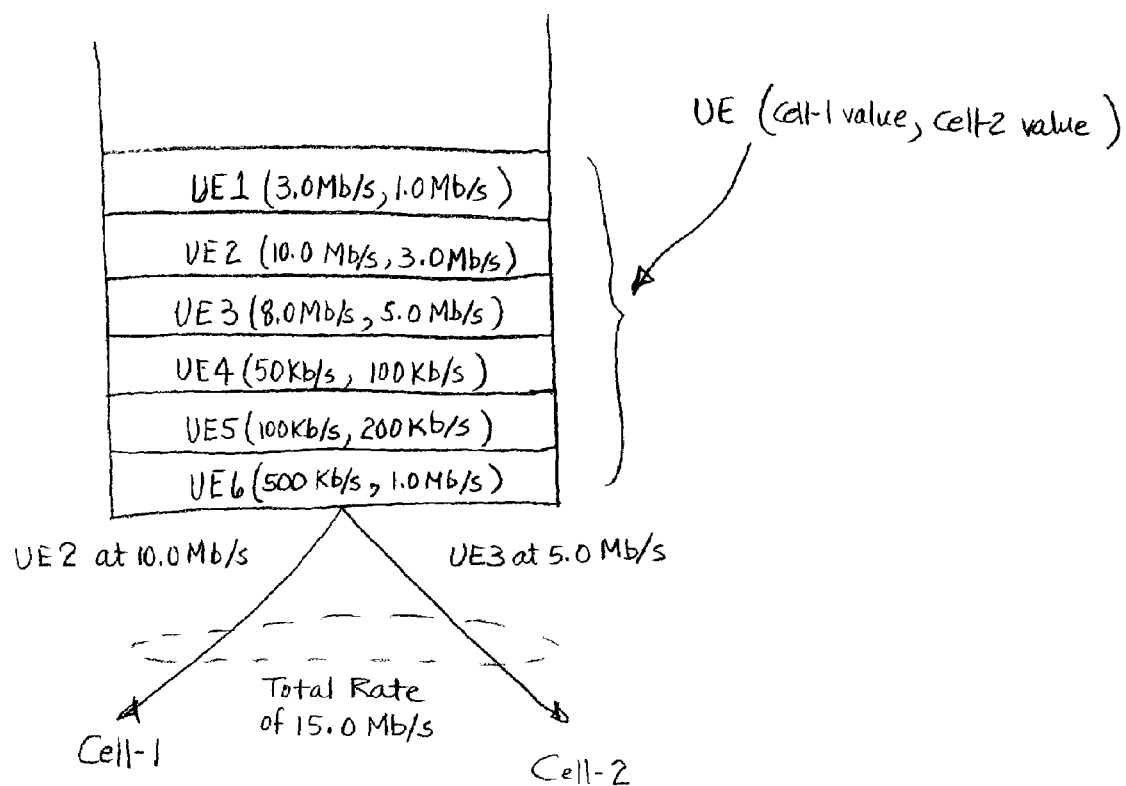
FIG. 2 depicts a queue set up by the method of the present invention for allocating data rate resources to UEs of a communication system.

In step 102, the global fast scheduler determines a resource allocation value for each of the available cell sites in the active set based on the received global CQI. The resource allocation value is a specific quantity of a particular resource that a cell site can provide to a UE requesting service. The scheduler determines the resource allocation value for a cell site from such factors as the number of UEs that the cell site is currently servicing, the quality of the communication channel between the requesting UE and the cell site and the total amount of the resource that can be allocated to the cell site without adversely affecting other cell sites servicing other UEs. Other factors can also be considered; the method of the present invention is certainly not limited to the factors listed above. An example of a resource is the data rate at which information can be transmitted from the cell site to the UE. In the case where the resource is the data rate, the resource allocation value is a specific value of a data rate that can be adequately allocated to a UE when the factors mentioned above are considered. An example of 6 UEs requesting service from 2 cell sites is shown in FIG. 2. Both cell sites (i.e., Cell-1 and Cell-2) are members of the active set of all 6 UEs.

Referring momentarily to FIG. 2, six UEs have transmitted CQI information to the scheduler which has determined the resource allocation value of each of the UEs for cell-1 and cell-2. In this case, the resource allocation is the data rate that a cell can provide to a particular UE. Thus, each UE has two values representing the resource allocation value associated with each cell site. For example UE1 has a resource allocation value of 3.0 Mb/s for Cell-1 and a resource allocation value of 1.0 Mb/s for Cell-2. The six UEs are placed in a queue by the global fast scheduler which then determines which two of the UEs are to be assigned to cell-1 and cell-2.

Referring back to FIG. 1, the global fast scheduler assigns a requesting UE to a cell site selected by the global scheduler. The global fast scheduler performs the assignment by selecting a cell site that can provide the determined resource allocation value to the UE. The selected cell site belongs to the active set of the UE and the global fast scheduler allows the UE to be serviced by that cell site. The global fast scheduler further performs the assignment by transferring the resource allocation value to the selected cell site and causing the cell site to transmit, to the UE, the resource allocation value along with a user ID which is an identifier that uniquely identifies the requesting UE. For many CDMA systems and other wireless systems, the UEs are given a user ID or MAC ID (Medium Access Control ID) by the communication system upon their registration into the system. The global fast scheduler causes the selected cell site to transmit the resource allocation value and the user ID to all six UEs, but only the UE with a matching user ID or matching MAC ID will process the information from the global scheduler. The UE and the selected cell site will then communicate with each other in accordance with the protocol being followed by the communication system to prepare the UE to receive information from the cell site to the UE over a downlink traffic communication channel. A traffic communication channel is a communication channel through which data traffic is conveyed. The information is transmitted in accordance with the resource allocation value specified by the global scheduler. The global fast scheduler has therefore scheduled the UE by determining when the UE is to be serviced by a particular cell site and the amount of a particular resource to be allocated to that UE by the cell site.

Continuing with the example in FIG. 2, the global fast scheduler has determined that UE2 and UE3 are to be assigned to Cell-1 and Cell-2 respectively. The global fast scheduler has selected UE2 and UE3 to obtain the best system performance for the resources available at the cell sites. By selecting UE2 and UE3, the global fast scheduler has chosen the set of UEs that provides the most throughput from the six UEs. The total data rate is 15 Mb/s. The global fast scheduler was able to select UE2 and UE3 because it has the flexibility of assigning a UE to any member of that UE's active set. Unlike prior art scheduling schemes, the global fast scheduler of the method of the present invention is not constrained to scheduling a UE to a specific cell site designated by the UE.

Figure 3:
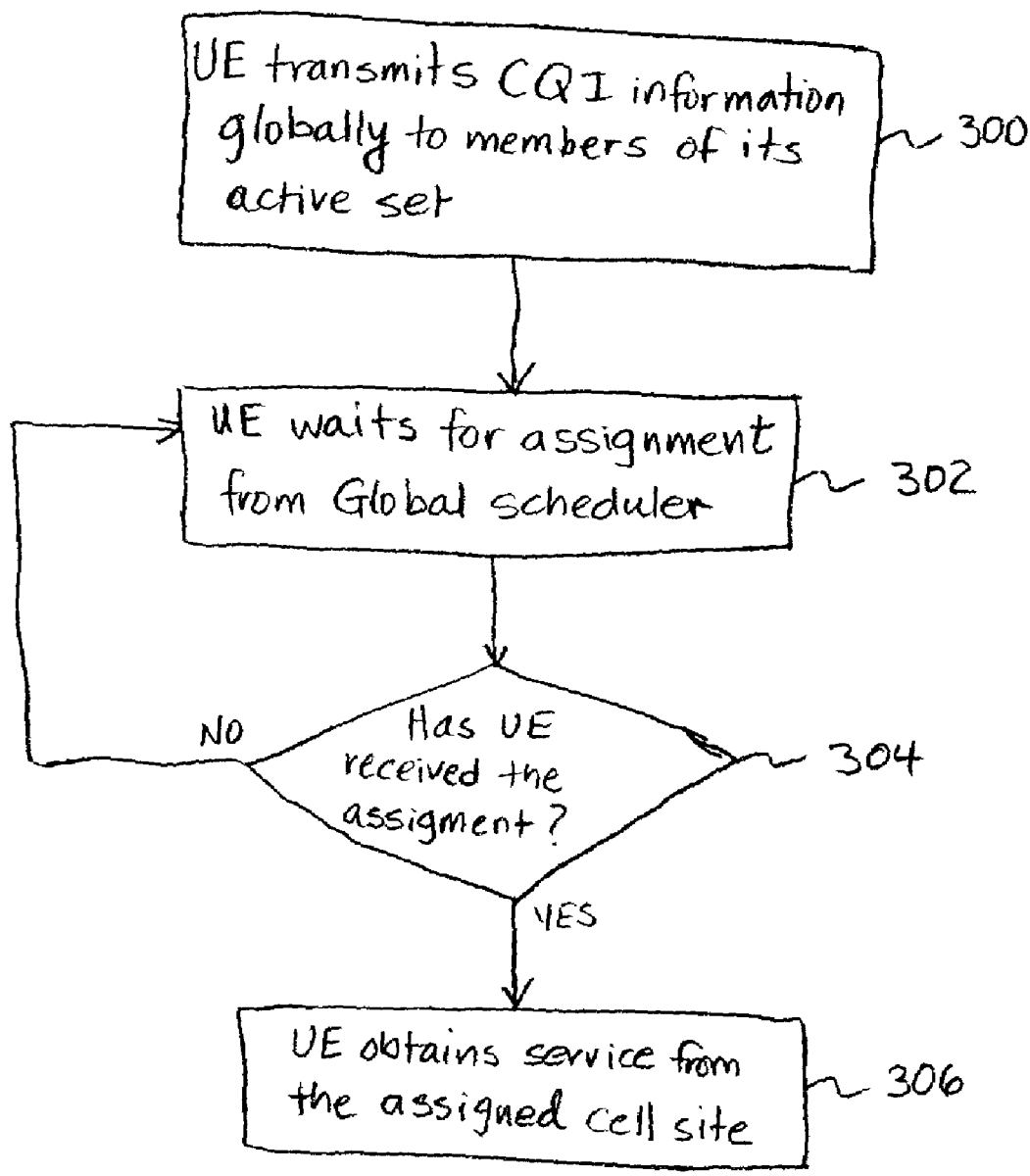
FIG. 3 depicts the method of the present invention from the standpoint of a UE.

Referring now to FIG. 3, a flow chart of the method of the present invention is shown from the standpoint of a UE. FIG. 3 represents a method for switching cell sites by a UE. In step 300, the UE transmits over the HS-DPCCH CQI information to cell sites that are members of its active set. Depending on the location of the UE, some members of the active set may not have received the CQI. The members of the active set, which received the global CQI, will then transfer the received CQI to the global scheduler. As discussed above, the global fast scheduler can be implemented as software/hardware residing in cell site equipment or software/hardware residing in other system equipment that can communicate with the cell sites. Alternatively, various portions of the global fast scheduler can reside in both the cell site equipment and other system equipment described above. The global CQI information may be a C/I measurement, a data rate requested by the UE or any other factors that indicate the quality of the communication channel (traffic and signaling) between the UE and the corresponding cell site.

The global fast scheduler has to receive and process the CQI information as quickly as possible to begin scheduling the UEs. To increase the proper reception of CQI information, the global scheduler can perform a CQI soft handoff diversity combining with the cell sites receiving the CQI information. A UE transmits its CQI information to all available members of its active set which may have received the CQI in error because for each member a portion of the CQI was received with errors. The global fast scheduler, instead of having the UE transmit the CQI again, can process the received erroneous CQI information from the members and combine them to arrive at an error free CQI; this process performed by the global fast scheduler is called a CQI soft handoff diversity combining.

In step 302, the UE monitors the downlink signaling channel, i.e., the HS-SCCH, for an assignment from the global fast scheduler via the cell site selected by the scheduler to service the UE. The assignment is information that contains at least one resource allocation value, a user ID and/or MAC ID or any other information that uniquely identifies the UE for which the resource allocation value is intended. The assignment also contains the Walsh cover of the cell site that transmitted such assignment. The assignment thus contains information that also identifies the cell site.

In step 304, the UE waits for the assignment from the global fast scheduler when no assignment is received. When an assignment is received by the UE, the method of the present invention moves to step 306. A UE will know that an assignment is meant for it because the assignment will contain the UE's MAC ID or User ID. Each cell has its own set of control channels (HS-SCCH) that carry the assignment information. A UE will be listening to at least one HS-SCCH from each of the cells in its active set. When a UE sees its ID on a HS-SCCH belonging to a cell, it knows that the data is going to come on the traffic channel of that cell. The UE receives the assignment from the global fast scheduler via the cell site and over a signaling channel such as an HS-SCCH.

In step 306, the UE and the assigned cell site communicate over the uplink and downlink signaling channels in accordance with the protocol being followed by the communication system to allow the assigned cell site to service the UE. Various information are exchanged between the UE and the cell site to establish service. The exchanged information are well defined by the protocol being followed by the communication system. Thus, the UE obtains service from a cell site by allowing the global fast scheduler to switch to the selected cell site based on the global CQI information received from the UE.

We claim:

1. A method for allocating at least one resource by a global fast scheduler of a communication system, the method comprising the step of:

assigning a UE (User Equipment) to a cell site of the communication system based on a resource allocation value determined from a global CQI (Channel Quality Indicator) information received from the UE where the cell site is a member of the UE's active set, and UE's active set information;

where the step of assigning a UE to a cell site comprises the steps of: selecting a cell site that can provide the determined resource allocation value; and transferring the resource allocation value to the selected cell site and causing the selected cell site to transmit the resource allocation value to the UE allowing the cell site to service the UE in accordance with a protocol being followed by the communication system.

2. The method of claim 1 where the global fast scheduler has access to active set information for the UE and can update the active set of the UE based on one or more factors.

3. The method of claim 1 where the global fast scheduler receives the CQI information by performing a CQI soft handoff diversity combining.

4. The method of claim 1 where the communication system is a UMTS and the UE transmits its global CQI information over an HS-DPCCH and the UE receives an assignment from the global fast scheduler via the cell site over an HS-SCCH.

5. A method of switching cells for a UE of a communication system, the method comprises the step of:

obtaining service by the UE(User Equipment) from a cell site of the communication system from an assignment transmitted by a global fast scheduler where such assignment contains at least one resource allocation value, a user ID and a code that identifies the cell site, where the assignment is base on the resource allocation value determined from a global channel quality indicator information and UE's active set information;

where the step of obtaining service by the UE comprises the steps of:

transmitting by the UE global CQI (Channel Quality Indicator) information to the global scheduler:

waiting for an assignment from the alobal fast scheduler where the assignment identifies and assigned cell site:

communicating over signaling channels with the assigned cell site in accordance with a protocol being followed by the communication system to allow the assigned cell site to service the UE.

6. The method of claim 5 where the UE transmits the global CQI to obtain at least one resource that allows it to receive downlink data traffic from a cell site.

7. The method of claim 5 where the communication system is a UMTS and the UE transmits its global CQI information over an HS-DPCCH and the UE receives the assignment from the global fast scheduler via the cell site over an HS-SCCH.

* * * * *